Feb. 8, 1949. J. E. WILCOX, JR 2,461,403
PHOTOGRAPHIC SYNCHRONIZER TESTER
Filed Jan. 28, 1946
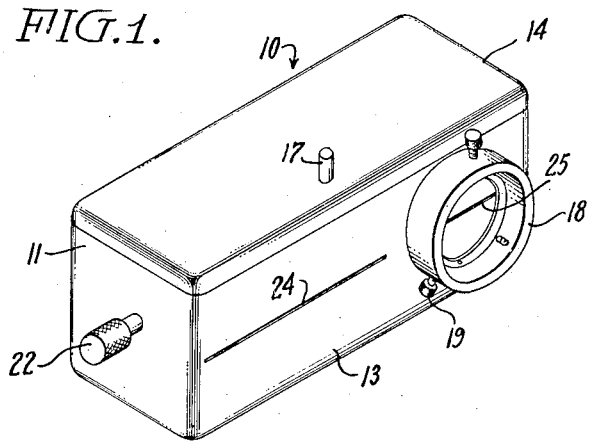
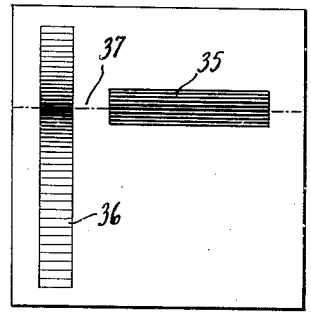
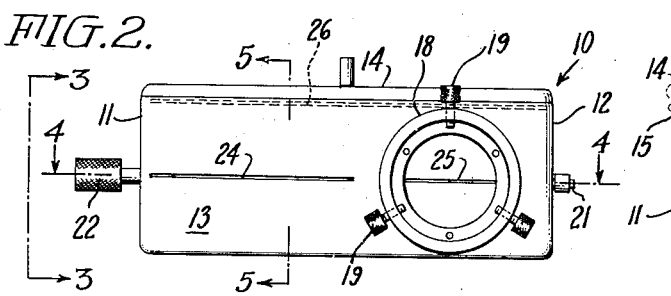
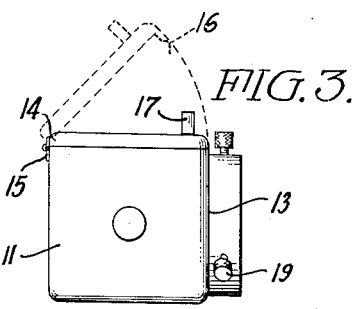
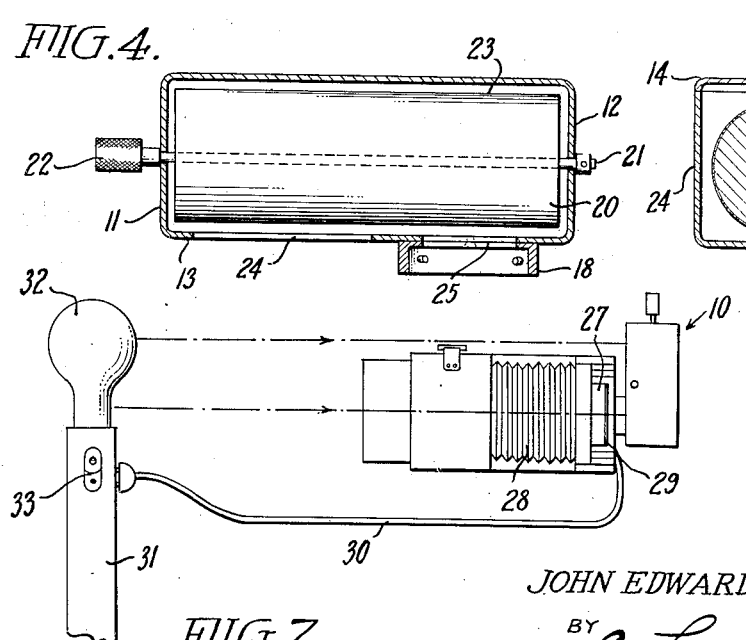
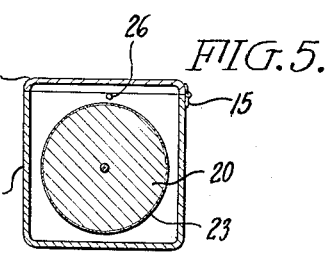
INVENTOR,
JOHN EDWARD WILCOX JR.
BY C. Lauren Maltby
ATTORNEY Patented Feb. 8, 1949

2,461,403

UNITED STATES PATENT OFFICE 2,461,403

PHOTOGRAPHIC SYNCHRONIZER TESTER

John Edward Wilcox, Jr., Los Angeles, Calif.

Application January 28, 1946, Serial No. 643,911

11 Claims. (Cl. 88—14)

1

This invention relates to photographic apparatus and more especially to a synchronizing tester for determining the synchronism of a camera shutter with the time of greatest intensity of a photo lamp flash.

An object of the invention is to provide a simple, practical and efficient synchronizer tester for testing the timing of the shutter of a camera with respect to a photo lamp flash.

Another object of the invention is to provide a shutter and flash lamp synchronizing tester adapted to be secured to a camera lens for testing under conditions of actual use.

Another object of the invention is to provide a novel photographic camera shutter synchronizing tester incorporating a rotating cylinder having a phosphorescent or light sensitizable surface capable of receiving traces for comparison to determine the degree of synchronism of the shutter with a photo lamp flash.

A further object of the invention is to provide a photographic synchronizer tester as set forth in the previous object wherein the traces so made will disappear after a short period of time so that subsequent traces may be soon made for checking the shutter after an adjustment has been made thereto.

An additional object of the invention is to provide a novel photographic synchronizer tester having portable characteristics adapted for attachment to a camera adapted for operation wherever the camera is in use, thus obviating the necessity of the usual laboratory equipment heretofore necessary for making shutter and flash synchronizing tests.

Other objects and advantages will appear and be brought out more fully in the following specification reference being had to the accompanying drawing forming a part thereof throughout which like characters refer to like parts and wherein:

Fig. 1 is a perspective view of a photographic synchronizer tester embodying my invention.

Fig. 2 is a side elevation view of the same.

Fig. 3 is an end elevation view of the same as seen from the line 3—3 of Fig. 2.

Fig. 4 is a sectional view taken along the line 4—4 of Fig. 2.

Fig. 5 is a transverse sectional view taken along the line 5—5 of Fig. 2.

Fig. 6 is a developed view of the surface of the cylinder showing the traces made thereon by a photo flash light.

Fig. 7 is a plan view showing the structure of Figs. 1 to 5 in association with a camera being tested and a flash lamp.

2

In the practice of the photographic art, extensive use is made of synchronized photoflash photography, wherein a photoflash bulb, consisting of combustible metal wire or shredded foil in an atmosphere of oxygen, is ignited electrically by means of batteries. As the bulb is ignited, a mechanical or electrical device trips the camera shutter so that the shutter reaches its maximum opening at the exact time the light reaches its maximum peak. Some adjustment is usually provided on the shutter tripping mechanism for delaying or advancing the timing thereof so that the shutter may be adjusted accurately to open at the exact time the light output from the photoflash bulb reaches its peak.

In commercial practice, this adjustment is usually made so that the shutter reaches its open position at about $20/1000$ of a second and, when the shutter is correctly adjusted, the maximum amount of light is transmitted through to the sensitized film while the shutter is open. A deviation in timing, either plus or minus as little as 10%, will cause the resulting negative to be underexposed, hence it is highly desirable that the shutter be adjusted to synchronize correctly with the flash bulb.

In the past, several methods of checking the synchronism of a photoflash synchronizer and a camera shutter have been produced, but all have either required the use of sensitized paper or film and subsequent development of the same to secure the record of the test. Some have been of a mechanical nature and subject to such mechanical disadvantages as friction, etc., so that the indicated adjustment might be open to question. Others have been of an electrical nature wherein the indication of the adjustment is somewhat hard to observe correctly. Some testers consist of electronic circuits, and, while accurate in setting the time of shutter opening, they do not fire a flash bulb while making the test and hence set the shutter to open at the time at which the flash bulb manufacturer states that his bulbs reach a peak light output, but this time may actually vary from batch to batch of bulbs and may be quite different between the several makes of bulbs on the market. Of the above mentioned types of testers, only those using sensitized paper or films would be able to furnish a simple "trace" of the shutter during the exposure so that any defects in the shutter operation could be easily noticed. These defects in the shutter may interfere with its proper operation and prevent correct adjustment of synchronization and yet be of a nature so that they could not be visually observed upon close examination.

The synchronizer tester comprising my present invention obviates and overcomes the objectionable features of present equipment as referred to and provides a simple, inexpensive, compact, lightweight structure capable of providing an accurate indication of the shutter and flash lamp synchronism that can be determined within an accuracy of approximately two or three milliseconds. These features and advantages will be apparent from the more detailed description of the accompanying drawing as follows.

In the drawing, I show a synchronizer tester comprising a somewhat elongated box or cabinet 10 having end walls 11 and 12, a front wall 13, a rear wall and a bottom and a top, the top being formed with a rectangular opening. A closable lid 14 for the top opening is provided, suitably hinged as at 15, whereby to maintain the interior of the cabinet 10 substantially light proof. Lid 14 may, however, be raised as indicated in Fig. 3 to permit viewing of the cylinder, or roller, bearing the flash trace as more fully described hereinabove. A strap spring catch 16 is provided on lid 14 and engageable with a co-operating member within front wall 13 to retain the cover in closed position, the cover, however, being readily opened by the aid of a handle or finger piece 17.

Mounting ring 18 is suitably secured or formed integrally with front wall 13 and is provided with a plurality of clamping screws 19 by which the ring and cabinet 10 may be secured to the lens of a camera as shown in Fig. 7.

Within cabinet 10 I provide a roller 20 having a shaft 21 extending through end walls 11 and 12 which provide suitable bearings therefor, the shaft having a knurled knob 22 for rotating the roller 20. Roller 20 is suitably coated with a photo-sensitive surface 23 which may be phosphorescent material capable of being luminescent for a short period of time, such as thirty to ninety seconds, after receiving a trace from a light source such as a flash bulb.

Front wall 13 is provided with a longitudinal slot 24 and a second longitudinal slot 25 aligned therewith, these slots being positioned substantially opposite the center line of roller 20, slot 25 being centered within mounting ring 18 and being centered substantially across the optical axis of the camera lens when the mounting ring and cabinet are secured thereto. A gauge indicating wire 26 is suitably mounted within cabinet 10 extending longitudinally over roller 20 and across the top opening for gauging the alignment of the traces on the cylinder 20.

In Fig. 7, I show the synchronizer 10 secured to the lens 27 of a camera 28 having a shutter mechanism 29, electrically actuated and connected through a shutter tripper cord 30 to a flash gun 31, having a flash bulb 32 and a switch 33 which, when closed, closes the electrical circuit through the flash bulb and the camera shutter actuating mechanism 29.

In the operation of the invention, the synchronizer is arranged as shown in Fig. 7 with the flash bulb behind the camera and the focusing panel screen thereof raised so that the lamp flash from bulb 32 may pass through the camera and through slot 25 to make a trace such as 35 as shown in Fig. 6, the light from bulb 32 passing externally of the camera directly to the roller 20 through slot 24 to make a trace such as 36. Trace 36 is of varying intensity. However, the center of the darkest part, such as indicated by the line 37, may be readily determined by viewing the roller through the top opening after raising lid 14, the roller being turned slowly until the center of trace 36 is aligned with wire 26 corresponding to the line 37 of Fig. 7.

The position of shutter trace 36 with respect to wire 26 can then be readily determined which will determine whether the shutter is in synchronism with the photo lamp flash. Taking into consideration the direction of rotation of the roller at the time the trace was made, the midline of trace 36 may appear above or below line 37 (or wire 26) if the shutter is out of synchronism, and if so, whether the shutter is fast or slow. If such be the case, an adjustment may be made to the shutter to correct the timing thereof and another flash test made after a minute or two of time has elapsed during which the traces previously made will disappear from the roller.

Trace 35 may be indicative of other improper shutter conditions. For instance, if trace 35 is over-exposed, it would indicate that the actual speed of the shutter is slower than it should be and the contrary condition would be similarly shown by a trace that is too light (a heavy trace being considered in terms of brightness of phosphorescent glow). If the trace 35 is not sharp in outline but shows outwardly curved edge portions, this would indicate that the shutter blades are dragging on opening or closing and need adjustment. If a separate small trace occurs after the formation of the trace 35, this would indicate the shutter blades bouncing open after the normal closing movement and the shutter would need adjustment to correct this condition.

The synchronizer tester shown and described is ideal for portable use and manual operation. However, it is within the purview of this invention to drive the roller 20 with a constant speed motor so that the actual shutter speed may be measured. If the speed of the motor, the diameter of the roller and the width of slot 25 are known, the actual speed of the shutter can be readily calculated. Also, as an alternative, if the speed of the roller is constant, a peripheral scale may be made thereon calibrated in microseconds and the speed of the shutter directly read from the scale. Other calibrating devices may be employed if desired.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices and systems.

Having thus described my invention, what I claim and desire to secure by Letters Patent is:

1. An apparatus of the character described comprising an opaque casing adapted to be mounted on a camera in front thereof, a rotatable light recording screen mounted in said casing with its axis at right angles to the longitudinal axis of the camera lens, said casing having a pair of spaced apertures formed in one wall thereof arranged in alignment longitudinally of said screen, a mounting member affixed to the casing adapted to be detachably secured to the front of the camera with one of said apertures in register with the camera lens and the other out of register with said lens whereby a portion of the light rays projected from the flash bulb disposed at the rear of the open camera will project through one of said apertures and record on said screen upon the opening of the shutter and a portion of said light rays will project through the other aperture and record on said screen.

2. Apparatus according to claim 1 wherein the light recording screen comprises a drum.

3. Apparatus according to claim 1 wherein the light recording screen comprises a drum having a phosphorescent coating.

4. Apparatus according to claim 1 wherein the light recording screen comprises a drum having a phosphorescent coating adapted to make a temporary recording.

5. Apparatus according to claim 1 wherein the light recording screen comprises a drum having a phosphorescent coating adapted to make a recording of relatively short duration.

6. Apparatus according to claim 1 wherein the light recording screen comprises a drum having a phosphorescent coating adapted to make a recording of relatively short duration of the order of thirty to ninety seconds.

7. Apparatus according to claim 1 wherein the light recording screen comprises a drum having a phosphorescent coating and said drum is provided with a manually actuatable knob.

8. Apparatus according to claim 1 wherein the light recording screen comprises a drum having a phosphorescent coating adapted to make a temporary recording and said casing is provided with a lid adapted to be opened for viewing said record.

9. Apparatus according to claim 1 wherein the light recording screen comprises a drum having a phosphorescent coating adapted to make a temporary recording and said casing is provided with a lid adapted to be opened for viewing said record and said lid comprises a plurality of panels forming a shadow box in opened position.

10. Apparatus according to claim 1 wherein the light recording screen comprises a drum having a phosphorescent coating adapted to make a temporary recording and said casing is provided with a lid adapted to be opened for viewing said record and said lid comprises a plurality of panels forming a shadow box in opened position and said casing is provided with a line-up guage under said lid.

11. Apparatus according to claim 1 wherein the light recording screen comprises a drum having a phosphorescent coating adapted to make a temporary recording and said casing is provided with a lid adapted to be opened for viewing said record and said lid comprises a plurality of panels forming a shadow box in opened position and said casing is provided with a line-up guage under said lid comprising a wire extending axially of said drum.

JOHN EDWARD WILCOX, Jr.

REFERENCES CITED

The following references are of record in the file of this patent:

UNITED STATES PATENTS

| Number | Name | Date |
| --- | --- | --- |
| 2,219,298 | Dashefsky | Oct. 29, 1940 |

OTHER REFERENCES

American Photographer for January 1942, pages 36 to 38 cited.